Patented Dec. 20, 1938

2,141,128

UNITED STATES PATENT OFFICE 2,141,128

NONENZYMATIC ACTIVATOR AND PROCESS OF MAKING SAME

Hans V. Euler, Henry Albers, and Fritz Schlenk, Stockholm, Sweden, assignors to E. Bilhuber, Inc., Jersey City, N. J., a corporation of New Jersey No Drawing. Application September 3, 1937, Serial No. 162,396. In Germany December 18, 1935

6 Claims. (Cl. 260—211)

The present invention comprehends cozymase products of markedly enhanced activity as well as certain processes and procedures whereby products of the desired high activity may be obtained.

Cozymase is a specific non-enzymatic substance for biologic carbohydrate degradation, which exerts characteristic action upon the first phases of fermentation in living plants and animal organisms and in vitro. It is useful for biochemical application where one is concerned with supplementing a deficiency of cozymase in biological substances.

It is known that the cozymase obtained from extracts of plant or animal origin, can be concentrated by treating the dialyzed extracts, after precipitation with soluble lead salts, with phosphotungstic acid or silico tungstic acid. Compare, for example, Hoppe Seylers Zeitschrift für Physiologische Chemie, vol. 139 (1924) page 281, etc., and vol. 169 (1927) page 102, etc.) Instead of using lead salts for the initial purification one can also use silver salts either in ammoniacal solution or a solution containing barium hydroxide. The resulting solutions however are decidedly variable and uncertain in respect to cozymase content and activity.

It is also known that the activity and uniformity of such solutions can be essentially improved if after precipitation with lead salts as above described, the solution be treated with picric acid as an intermediate step prior to the complex acid treatment above referred to, or if precipitation with mercury salts be included as another intermediate step prior to the picric acid treatment above referred to. (German Patent No. 529,319, July 11, 1931.)

It is also known that in processes as above described, a purer end product may be obtained in greater yield, if between the treatment with lead acetate, and treatment with mecuric nitrate or precipitation with picric acid, the intermediate step be employed of precipitating the cozymase as a basic aluminum salt (German Patent No. 554,008, issued July 4, 1932). Solutions may be thus obtained which are about 800 times more active than the starting materials, and solid cozymase preparations as thus prepared may have a maximum activity of about 125,000 Co units per gram. (The unit above referred to may be defined as that quantity of cozymase which produces 1 cc. of $CO_2$ per hour in a normal fermentation, and is discussed more at length in Zeitschrift für Physiologische Chemie, vol. 123, p. 93; vol. 136, pp. 108–112, vol. 240, pp. 114–115.)

In accordance with the present invention, cozymase preparations of markedly enhanced activity (up to 400,000 Co units per gram) may be obtained, starting with solutions or solid preparations of the lower order of activity above described, and subjecting them to further purification by treatment in acid solution with a cuprous halide. Cozymase as thus prepared in solid form will have an activity of the order of 400,000 Co units per gram. Warburg's coferment (an activator for hexosemonophosphate dehydrogenation) can be separated at the same time from the mother liquors of the cuprous halide precipitation in cozymase separation. (Warburg's coferment is discussed in Zeitschrift für Physiologische Chemie, vol. 238, pages 239–260.)

In accordance with another phase of the present invention a still greater increase in potency of the cozymase preparation may be obtained if the product obtained by precipitation in acid solution with a monovalent copper halide as last described, is again dissolved in water, then treated with barium hydroxide, and the cozymase then adsorbed on alumina. This adsorption product is then extracted, and the extract is precipitated by the addition of an organic solvent miscible with water, such as acetone, ethyl alcohol or mixture thereof with ether. In this manner cozymase may be obtained having a purity and strength of ACo=650,000, and the product no longer shows a free adenylic acid reaction. (The ACo unit is also discussed and related to the Co unit in the publications above cited; briefly stated it equals the number of Co units per gram.) Or in accordance with this latter phase of the invention, instead of adsorbing the cozymase on alumina, lead salts can be added to the aqueous cozymase solution after precipitation thereof with barium salts as above described, the resulting precipitate filtered, the filtrate freed of lead by passing hydrogen sulfide therethrough, and the cozymase precipitated as above described.

Example No. 1

In order to carry out the phase of the present invention which is first above discussed, and as a specific example of a procedure appropriate therefor, we may start with a cozymase solution of the lower order of activity above described as having been known in the art prior to the present invention, as in German Patents Nos. 529,319 and 554,008 above referred to. Such a starting solution may be obtained for example by treating a cozymase solution with soluble lead or silver salts, and subsequently with aluminum sulfate, and precipitating in the presence of ammonia. The basic aluminum salts of the cozymase may then be decomposed with phosphoric acid, and the resulting solution either immediately fractionally precipitated with picric acid, or an intermediate step of precipitating with a mercury salt may be employed, prior to the picric acid treatment. The more soluble picrate may be then decomposed with a complex acid such for example as silico-tungstic acid.

In practicing the present invention, a starting aqueous solution containing cozymase prepared in the above manner, may be used in quantity of 17 cc. of solution, containing about 2753 Co units per cc. or a total of about 46,800 Co units. This solution is adjusted to a pH value of about 3.5 to 4.5 in known manner, and is then treated with a cuprous chloride solution in the proportion of about .5 gm. of the last mentioned solution for every 10,000 Co units present. (The cuprous chloride solution should be fresh and quickly prepared, and may be made by dissolving .5 gm. cuprous chloride in 4.5 cc. of 25% potassium chloride solution containing 0.1% hydrochloric acid.)

The precipitate resulting from the cuprous chloride treatment above referred to is then centrifuged and washed several times with water, and is then suspended in water using about 10 cc. of water for every 10,000 Co units present; part of the precipitate goes into solution. The above mixture is then chilled and hydrogen sulfide gas passed into the same for about 30 to 40 minutes, or sufficiently to insure saturation and complete reaction with the copper to form copper sulfide. The copper sulfide is then filtered off (air may be bubbled through the filtrate to remove any excess of hydrogen sulfide), and the highly active cozymase may be obtained from the filtrate in crystalline form by adding alcohol and then adding ether, or by evaporating under vacuum.

About 95 mgs. of solid cozymase are thus obtained in the form of thin feather-like crystals which are very soluble in water, and contain about 36,000 Co units, representing a yield of about 77%. The product contains about 380,000 Co units per gram, and is practically free from sulfur, having an empirical formula approximating $C_{12}H_{19}N_4PO_9$.

*Example No. 2*

In order to isolate the Warburg coferment from the mother liquor of a cuprous chloride precipitation of the character produced during the procedure above described, an excess of ethyl alcohol is added to the mother liquor, and the resulting precipitate (which consists of the copper compound of Warburg's coferment) is washed several times with small portions of water. The washed mass is then suspended in water and decomposed by passing in hydrogen sulfide. The copper sulfide precipitate is then filtered off and Warburg's coferment obtained from the filtrate by adding alcohol, and then ether, or by concentrating in a vacuum as above described in connection with Example 1. A yield of about 5 mg. of the Warburg coferment is obtained from the specified mother liquor of Example 1, in the form of a white readily water soluble powder (100,000 times more concentrated than the starting material).

*Example No. 3*

In order still further to augment the activity of cozymase of the character above described, 1 gm. of the product of Example 1 (having an activity of about 380,000 ACo units) may be dissolved in 20 cc. of water, after which the solution is neutralized to a pH value of about 6.5 with barium hydroxide, and the resulting precipitate is centrifuged out. The barium is precipitated by adding sulfuric acid, and filtered out. In order to adsorb the cozymase on alumina, the filtrate may be forced through an alumina column filter (Merck, Darmstadt, Germany; standardized by the method of Brokmann); the adsorption column is extracted with 100 cc. of water, and the resulting extract is then concentrated to about one tenth of its volume. Acetone to the amount of 10 times the quantity of concentrate is added to precipitate the cozymase.

The above procedure yields .32 gm. of solid cozymase, representing a yield of about 54.6% and such product contains about 650,000 Co units per gm., and has an empirical formula approximating $C_{21}H_{27}N_7P_2O_{14}$.

*Example No. 4*

The same starting compound may be employed as in Example 3, dissolving 1.7 gms. thereof in 30 cc. of water, and adjusting to an acidity of pH=6.5 by adding barium hydroxide solution, the resulting precipitate centrifuged out, and the solution adjusted to a pH value of 2.5 by adding sulfuric acid. The precipitated barium sulfate is centrifuged off, and the solution treated with 5 gms. of finely powdered lead acetate. The mixture is now cooled and allowed to stand. After separating off the precipitate by centrifuging, the solution is freed of lead by passing in hydrogen sulfide, is then concentrated by evaporating as above described in Example 3 and the cozymase may be precipitated by adding ten times the quantity of ethyl alcohol. The yield is 0.45 gm. of cozymase, ACo=650,000, a yield of 45%.

Further discussion bearing upon certain phases of the present invention will be found in Zeitschrift für Physiologische Chemie, vol. 234, at pages I and II; vol. 241, page 239; and vol. 246, page 64. This application also contains subject matter disclosed in our prior U. S. application Ser. No. 157,552, filed August 5, 1937, entitled "Processes for the preparation of a non-enzymatic activator and product therefrom".

While the invention has been described by reference to certain specific procedures and resulting products, it should be understood that changes may be made therein without departing from the invention in its broader aspects within the scope of the appended claims.

We claim:

1. A process of the character described for treating cozymase compounds of a relatively lower order of activity in order to augment the activity thereof which includes adjusting a solution containing such compounds to a pH value of the order of 6.5 by adding barium hydroxide to form a precipitate, removing the barium content from said precipitate, adsorbing the cozymase content of the remaining compounds on alumina and then extracting cozymase therefrom.

2. A process of the character described for treating cozymase compounds of a relatively lower order of activity in order to augment the activity thereof which includes adjusting a solution containing such compounds to a pH value of the order of 6.5 by adding barium hydroxide to form a precipitate, removing the barium content from said precipitate, treating the remaining compounds with lead acetate, removing the lead therefrom and recovering the cozymase therefrom.

3. A process of the character described for treating cozymase compounds of a relatively lower order of activity in order to augment the activity thereof which includes adjusting a solution containing such compounds to a pH value of the order of 6.5 by adding barium hydroxide to form a precipitate, removing the barium content from said precipitate and separating the cozymase from remaining compounds.

4. A cozymase of the class described having an activity of the order of 300,000 to 650,000 ACo units, and comprising a product substantially identical with that obtained by treating a cozymase containing solution of lower order of activity with a monovalent copper halide in acid solution to form a precipitate, treating the precipitate to remove copper content therefrom, and then further treating to recover the cozymase therefrom.

5. A cozymase of the class described having an activity of the order of 300,000 to 650,000 ACo units, and comprising a product substantially identical with that obtained by treating a cozymase containing solution of lower order of activity with a monovalent copper halide in acid solution to form a precipitate, treating the precipitate to remove copper content therefrom, further treating to recover cozymase therefrom, adjusting a solution containing such last mentioned cozymase compound to a pH of the order of 6.5 by adding barium hydroxide to form a precipitate, removing the barium content from said precipitate and separating the cozymase from remaining compounds.

6. A cozymase of the class described having an activity of the order of 650,000 ACo units and comprising a product substantially identical with that obtained by adjusting a solution containing cozymase of a relatively lower order of activity to a pH of the order of 6.5 by adding barium hydroxide to form a precipitate, removing the barium content from said precipitate and separating the cozymase from remaining compounds.

HANS V. EULER.
HENRY ALBERS.
FRITZ SCHLENK.